UNITED STATES PATENT OFFICE.

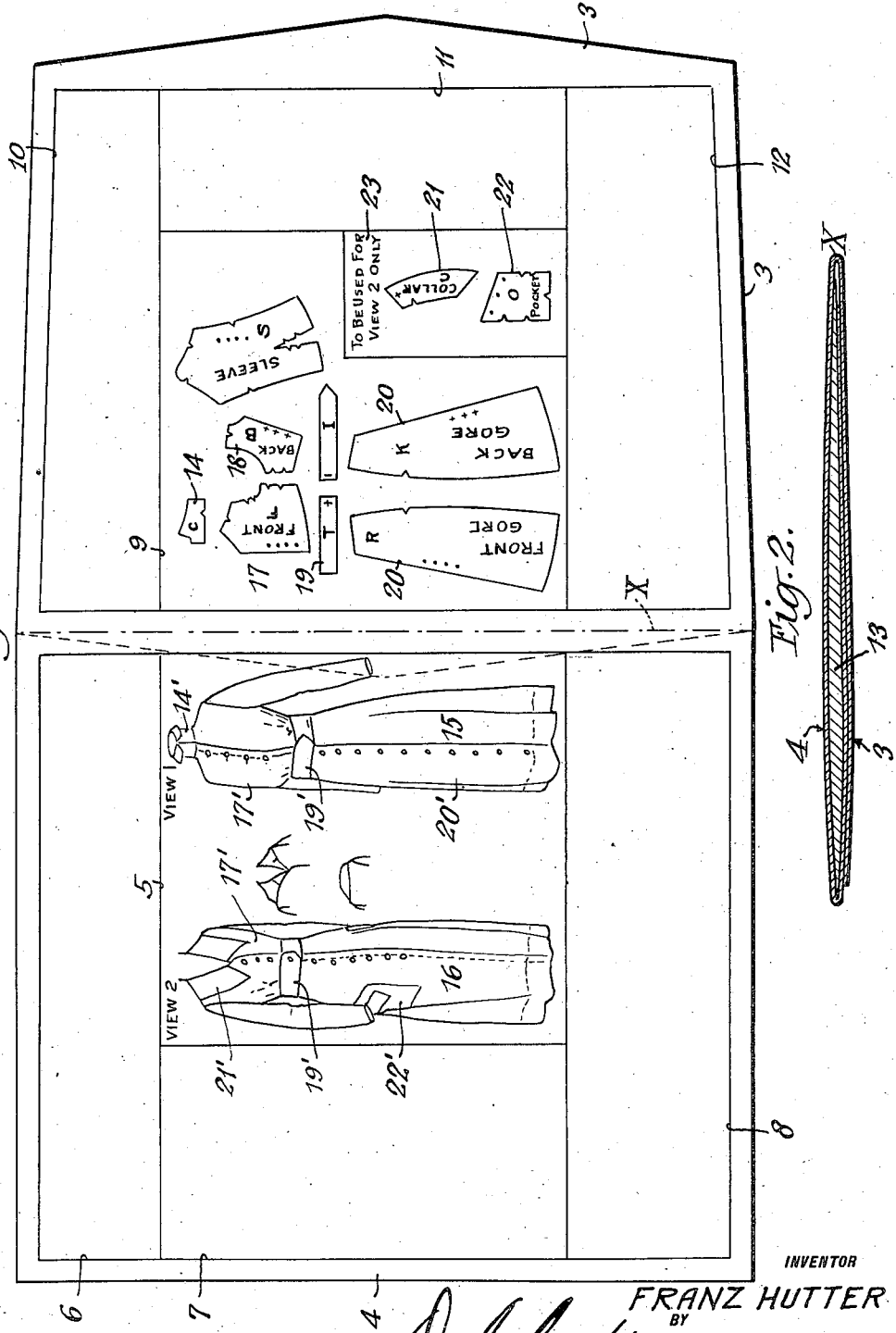

FRANZ HUTTER, OF NEW YORK, N. Y., ASSIGNOR TO THE McCALL COMPANY, A CORPORATION OF NEW YORK.

PATTERN-ENVELOP.

1,375,292.

Specification of Letters Patent.

Patented Apr. 19, 1921.

Application filed January 24, 1918. Serial No. 213,466.

*To all whom it may concern:*

Be it known that I, FRANZ HUTTER, a subject of the Emperor of Austria-Hungary, having declared my intention of becoming a citizen of the United States, and a resident of the city, county, and State of New York, whose post office address is % The McCall Company, 236 West 37th street, New York city, New York, have invented certain new and useful Improvements in Pattern-Envelops, of which the following is a specification.

My invention relates to envelops for paper patterns used for example in dress making and consists chiefly in the production of an envelop having illustrations and instructions printed thereon in such locations that the relationship between the several views can be easily and quickly seen and understood by the unskilled as well as those familiar with the dressmaking arts.

The objects and features of novelty will be apparent from the following description, particularly pointed out in the subjoined claims.

In the drawing, Figure 1 is a face view of a pattern envelop with the elongated back flap opened out flat in the position it is adapted to assume when the work is being laid out from a pattern taken from the envelop;

Fig. 2 is a sectional view through the envelop containing a pattern showing the elongated back flap in closed position.

It is customary on pattern envelops to print considerable instructive data and diagrams to assist in laying out the work, cutting the goods and making up the garment. The various printed instructions, illustrations and diagrams require considerable space to be legible and for this reason much of the data is usually printed on the back of the envelop, a small area being left plain for the short flap to fold over onto. By utilizing both the back and front of the envelop for the illustrations, diagrams and printed instructions, the illustrations can be made on a scale large enough to be easily interpreted, and the print of large enough type to be easily read.

However, experience has taught that it is quite troublesome and impractical to be continually turning the envelop over and over to make comparison of one diagram with another and to read directions on one side of the envelop relating to a diagram which is printed on the other side.

To overcome the above objections, I have devised the envelop with the elongated back flap 3 as illustrated in the accompanying drawings.

The elongated back flap 3 furnishes a convenient place on which to print much of the illustrative and descriptive matter that has hitherto been printed on the back of the envelop proper, with the advantage that all the illustrations and text are visible at the same time when the flap is opened out by unfolding along the line X as shown in Fig. 1.

Many attempts have been made to provide construction guides or diagrams on pattern envelops to assist the user in planning and executing the work, some of these guides using cross reference letters to identify the several parts and others using numbers indicating the sequence in which the parts are to be put together, all of which are more or less confusing and require considerable time and patience to interpret.

On my improved envelop I have carefully planned out the location of both the illustrative diagrams and the printed instructions.

In the present embodiment of my invention I have elected to dispose the various parts of the instructive data as shown in Fig. 1, but it is of course to be understood that I do not limit myself to the exact arrangement there shown.

I have divided the front face 4 of the envelop into four rectangular areas 5, 6, 7 and 8, and the back flap into similar areas 9, 10, 11 and 12. The rectangles 6 and 10 are provided to contain the title, giving the name of the company making the pattern, the number of the pattern and general information such as waist measure, length, etc.

In the rectangle 7 is printed a measurement table indicating the amount of material necessary for a garment corresponding to different sizes and in the space 8 is printed a diagram showing how to best cut the goods economically.

In the rectangles 11 and 12 on the back flap are printed instructions respectively on how to cut the material, and how to make up the garment after the pieces are all cut out.

In the space 5 on the front of the envelop, are shown two different styles 15 and 16 of a completed garment either of which may be made from the pattern 13 inclosed in the envelop. In the space 9 on the back flap 3 are shown diagrammatic detail views of the component parts of the pattern.

The illustrations of the different parts are located in the rectangle 9 in such positions that the separate parts can be easily identified, for example, the detail of the collar 14 is substantially in line with the collar 14' of the complete garment, the waist parts 17 and 18 in line with the waist 17' on the garments 15 and 16. The belt and skirt parts 19 and 20 being similarly located with respect to the illustration 15 and 16. In other words the details of the component parts are illustrated substantially in line with the locations in which they appear in the illustration of the completed garment. The parts 21 and 22 are for optional use in the style of garment illustrated at 16, the printed descriptive matter 23 identifying the two.

In the drawing the spaces 5 and 9 are shown of exactly the same height in consequence of which the separated figures in space 9 have to be on a slightly smaller scale than the assembled parts in space 5. The same reasons throw certain parts, such as the belt, slightly out of line, comparing one set of figures with the other. But, they are substantially in line or so nearly in line that the eye readily associates the parts in one group with those in the other. Again, it will be understood that the quantity of descriptive matter required on the two parts of the envelope may be different and it may be desired to make one of the spaces 8 or 9 larger than the other and to locate the center latitudinal line of one above or below that of the other. But these spaces must be kept so nearly in alinement as to enable the eye to readily associate the parts in one space with the same parts in the other space.

In some cases the descriptive and illustrative directions for the use of patterns are printed on cards or labels which are not integral parts of the envelop, but such labels are generally subject to the same restrictions as to size which are present in envelops. And, the herein described arrangement of the groups and the separate part illustrations is applicable also to such labels with advantage, and such labels are to be considered as the equivalent in this respect of the envelops herein specifically described. For example, Fig. 1 may be considered a complete face view of such a label.

It is conceivable that the figures showing the complete garment might be printed on the back flap, and the details on the front flap or the dispositions of the groups of illustrations 5 and 9 may be separated by a column of printed descriptive matter. In fact various changes may be made in details and in the arrangement of the descriptive and of the illustrative matters without departing from the invention, as defined in the following claim.

What I claim is:

A pattern envelop having thereon at least one illustration of a complete garment and a group of separate illustrations of the several component parts, the envelop including a flap, said illustration of the complete garment and said group of illustrations being delineated on different parts of the envelop and so arranged that when the flap is opened out all the illustrations will appear in substantially one plane and the separate illustrations in said group will appear substantially in line with the locations in which they appear in the illustration of the completed garment.

In witness whereof, I have hereunto signed my name.

FRANZ HUTTER.